United States Patent
Sun et al.

(10) Patent No.: US 12,445,887 B2
(45) Date of Patent: Oct. 14, 2025

(54) PARSING METHOD FOR RECEIVED CHANNEL POWER INDICATOR VALUE, AND DEVICE AND STORAGE MEDIUM

(71) Applicant: ZTE CORPORATION, Shenzhen (CN)

(72) Inventors: Ce Sun, Shenzhen (CN); Endong Zhao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 429 days.

(21) Appl. No.: 18/003,390

(22) PCT Filed: Jun. 21, 2021

(86) PCT No.: PCT/CN2021/101315
§ 371 (c)(1),
(2) Date: Dec. 27, 2022

(87) PCT Pub. No.: WO2022/001731
PCT Pub. Date: Jan. 6, 2022

(65) Prior Publication Data
US 2023/0247462 A1    Aug. 3, 2023

(30) Foreign Application Priority Data

Jun. 29, 2020 (CN) .......................... 202010607400.4

(51) Int. Cl.
*H04W 24/10* (2009.01)
*H04B 17/318* (2015.01)

(52) U.S. Cl.
CPC .......... *H04W 24/10* (2013.01); *H04B 17/318* (2015.01)

(58) Field of Classification Search
CPC ..... H04W 24/10; H04W 84/12; H04B 17/318
See application file for complete search history.

(56) References Cited

U.S. PATENT DOCUMENTS

2005/0036570 A1*  2/2005  Kwak ................. H04B 17/309
                                                    375/316
2008/0032628 A1   2/2008  Vehvilainen et al.
(Continued)

FOREIGN PATENT DOCUMENTS

CN          101253715 A     8/2008
CN          105409286 A     3/2016
(Continued)

OTHER PUBLICATIONS

International Searching Authority. International Search Report and Written Opinion for PCT Application No. PCT/CN2021/101315 and English translation, mailed Sep. 24, 2021, pp. 1-12.
(Continued)

*Primary Examiner* — Charles C Jiang
*Assistant Examiner* — Ryan C Kavleski
(74) *Attorney, Agent, or Firm* — Vivacqua Crane, PLLC (57) ABSTRACT

A method for parsing a Received Channel Power Indicator (RCPI) value, a device and a storage medium are disclosed. The method for parsing a RCPI value may include: sending a measurement request for measuring strength of a connected signal to a terminal device; receiving a measurement report sent by the terminal device based on the measurement request, where the measurement report carries an RCPI value; determining a corresponding parsing algorithm according to a value interval in which the RCPI value is located; and parsing the RCPI value by utilizing the determined parsing algorithm.

13 Claims, 4 Drawing Sheets

(56) References Cited

U.S. PATENT DOCUMENTS

2013/0242876 A1    9/2013  Kwak et al.
2017/0026929 A1*   1/2017  Grischy ................ H04W 24/10
2019/0150084 A1    5/2019  Karaca et al.
2022/0165146 A1*   5/2022  Daoura ................ H04W 8/005

FOREIGN PATENT DOCUMENTS

CN    111278073 A    6/2020
CN    111314994 A    6/2020

OTHER PUBLICATIONS

3GPP Technical Specification Group Radio Access Network. "RCPI and RSNI measurements," 3GPP TSG-RAN2 WG1 Meeting #78, Aug. 2014, pp. 1-4.

Erceg, V., et al. "Liaison response to 3GPP R2-141855," IEEE 802.11-14/0678r1, May 2014, pp. 1-5.

European Patent Office. Extended European Search Report for EP Application No. 21833484.5, mailed Nov. 8, 2023, pp. 1-12.

* cited by examiner

PARSING METHOD FOR RECEIVED CHANNEL POWER INDICATOR VALUE, AND DEVICE AND STORAGE MEDIUM

CROSS-REFERENCE TO RELATED APPLICATION

This application is a national stage filing under 35 U.S.C. § 371 of international application number PCT/CN2021/101315, filed Jun. 21, 2021, which claims priority to Chinese patent application No. 202010607400.4 filed Jun. 29, 2020. The contents of these applications are incorporated herein by reference in their entirety.

TECHNICAL FIELD

Embodiments of the present disclosure relate to, but not limited to, the technical field of communication, in particular to a method for a parsing received channel power indicator value, a device and a storage medium.

BACKGROUND

With the improvement of people's living standards and living conditions, the demand for wireless networks in families is becoming more and more popular, which in turn leads to new requirements for the coverage of Wi-Fi signals. In this case, wireless mesh networks (WMNs) came into being. A wireless mesh network, also known as "multi-hop" network, is a star-shaped dynamic self-organizing and self-configuring wireless network that connects multiple access points (APs) by means of wireless links. Compared with the traditional wireless local area network (WLAN), the most important feature of the wireless mesh network is that APs in a backbone network are connected wirelessly, which is one of the key technologies to solve the problem of "last kilometer".

However, in the wireless mesh network, roaming between different APs is usually involved, which requires the use of a WLAN standard, i.e., the IEEE 802.11k standard. One of the functions implemented by this standard is to improve roaming decisions, which involves the parsing of a parameter of Received Channel Power Indicator (RCPI) related to a received signal strength. In practical applications, there are two algorithms for filling and parsing RCPI values. One is defined in IEEE 802.11k standard, and the other is not defined in the standard. These two algorithms are greatly different and difficult to be compatible and identified. When a terminal Station (STA) is guided to measure signals of other specific APs by means of the IEEE 802.11k standard, the RCPI values output by STAs from different manufacturers are based on the above two incompatible algorithms, which leads to difficulties in identifying and parsing RCPI values, reduces the accuracy of RCPI value parsing, and thus reduces the precision of terminal device roaming decisions.

SUMMARY

The following is a summary of the subject described in detail herein. This summary is not intended to limit the scope of protection of the claims.

Embodiments of the present disclosure provide a method for parsing a Received Channel Power Indicator (RCPI) value, a device and a storage medium, which can improve the accuracy of RCPI value parsing.

In accordance with an aspect of the present disclosure, an embodiment provides a method for parsing a RCPI value, which may include: sending a measurement request for measuring strength of a connected signal to a terminal device; receiving a measurement report sent by the terminal device based on the measurement request, where the measurement report carries an RCPI value; determining a corresponding parsing algorithm according to a value interval in which the RCPI value is located; and parsing the RCPI value by utilizing the determined parsing algorithm.

In accordance with another aspect of the present disclosure, an embodiment further provides a device. The device may include: a memory, a processor, and a computer program stored in the memory and executable by the processor which, when executed by the processor, causes the processor to perform the method for parsing a RCPI value described above.

In accordance with another aspect of the present disclosure, an embodiment further provides a computer-readable storage medium, which is stored with a computer-executable instruction for performing the method for parsing a RCPI value described above.

Other features and advantages of the present disclosure will be set forth in the following description, and partly become obvious from the description, or understood by implementing the present disclosure. The objects and other advantages of the present disclosure can be realized and obtained by the structure particularly pointed out in the description, claims and drawings.

BRIEF DESCRIPTION OF DRAWINGS

The drawings are provided for a further understanding of the technical schemes of the present disclosure and constitute a part of the description. The drawings and the embodiments of the present disclosure are used to illustrate the technical schemes of the present disclosure and do not constitute a limitation to the technical schemes of the present disclosure.

DETAILED DESCRIPTION

In order to make the objects, technical schemes and advantages of the present disclosure clear, the present disclosure will be further described in detail with reference to the drawings and embodiments. It should be understood that the specific embodiments described here are only used to illustrate the present disclosure, and are not intended to limit the present disclosure.

It is to be noted, although functional modules have been divided in the schematic diagrams of apparatuses and logical orders have been shown in the flowcharts, in some cases, the modules may be divided in a different manner, or the steps shown or described may be executed in an order different from the orders as shown in the flowcharts. The terms such as "first", "second" and the like in the description, the claims, and the accompanying drawings are used to distinguish between similar objects, and are not necessarily used to describe a specific sequence or a precedence order.

Embodiments of the present disclosure provide a method for parsing a Received Channel Power Indicator (RCPI) value, a device and a computer-readable storage medium. In the schemes provided by the embodiments of the present disclosure, by making full use of non-overlapping blind areas, also called unreasonable intervals, respectively existing in the current two parsing algorithms, based on an either/or exclusion method, an appropriate parsing algorithm can be determined by utilizing a value interval in which the obtained RCPI value is located, thereby compatibly parsing two kinds of RCPI values which are output based on different definitions, which improves the accuracy of RCPI value parsing, and thus improves the capability for supporting various terminal device roaming decisions and the precision of roaming decisions.

The embodiments of the present disclosure will be further illustrated with reference to the accompanying drawings.

Figure 1:
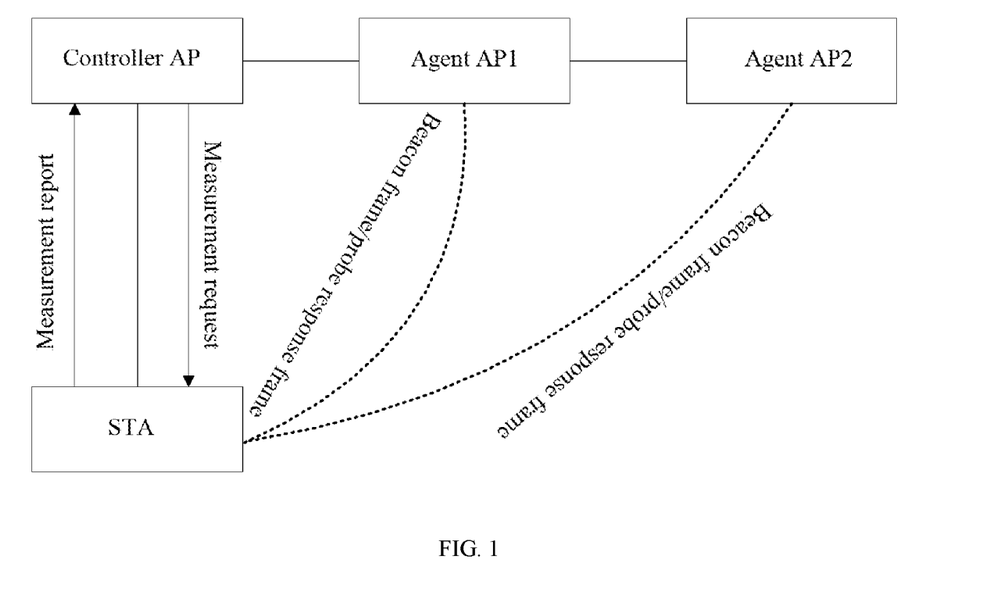
FIG. 1 is a schematic diagram of a network topology for performing a method for parsing a Received Channel Power Indicator (RCPI) value provided by an embodiment of the present disclosure.

FIG. 1 is a schematic diagram of a network topology for performing a method for parsing a RCPI value provided by an embodiment of the present disclosure. As illustrated in FIG. 1, the network topology includes a controller Access Point (AP), a plurality of agent APs (for simplicity of description, only two agent APs, namely, Agent AP1 and Agent AP2, are shown in FIG. 1), and a terminal device station (STA) including for example, mobile phones or computer terminal devices and the like which support the IEEE 802.11k standard from various manufacturers. In the network topology, when the method for parsing a RCPI value provided by the embodiments of the present disclosure is performed, the controller AP sends a measurement request (such as a measurement request frame or a data frame in which measurement request information is encapsulated) for measuring strength of a connected signal to an STA to be measured, and the STA obtains an RCPI value of an AP signal and generates a measurement report (such as a measurement report frame or a data frame in which the measurement report is encapsulated), and then sends the measurement report back to the controller AP for further parsing. In addition, in the network topology, APs, such as Agent AP1 and Agent AP2, may periodically send beacon frames to inform the STA the presence of the network, so as to adjust parameters required for joining the network. A mobile node, such as an STA, may also send a probe request frame to scan for APs available in an area where the mobile node is located. After receiving the probe request frame, the APs may return probe response frames which have almost the same contents as the beacon frames, and then the APs may continue to initiate an access process by utilizing some information in the probe response frames.

The network topology and application scenario described in the embodiments of the present disclosure are intended to illustrate the technical schemes in the embodiments of the present disclosure clearly, and are not intended to constitute a limitation to the technical schemes provided by the embodiments of the present disclosure. Those having ordinary skills in the art may know that, with the evolution of network topologies and the emergence of new application scenarios, the technical schemes provided by the embodiments of the present disclosure are also applicable to similar technical problems.

Those having ordinary skills in the art can understand that various components and topology shown in FIG. 1 do not constitute a limitation to the embodiments of the present disclosure and may include more or fewer components than shown, or combinations of some components, or different component arrangements.

Based on the above network topology, various embodiments of the method for parsing a RCPI value of the present disclosure are proposed below.

Example Embodiment One

Figure 2:
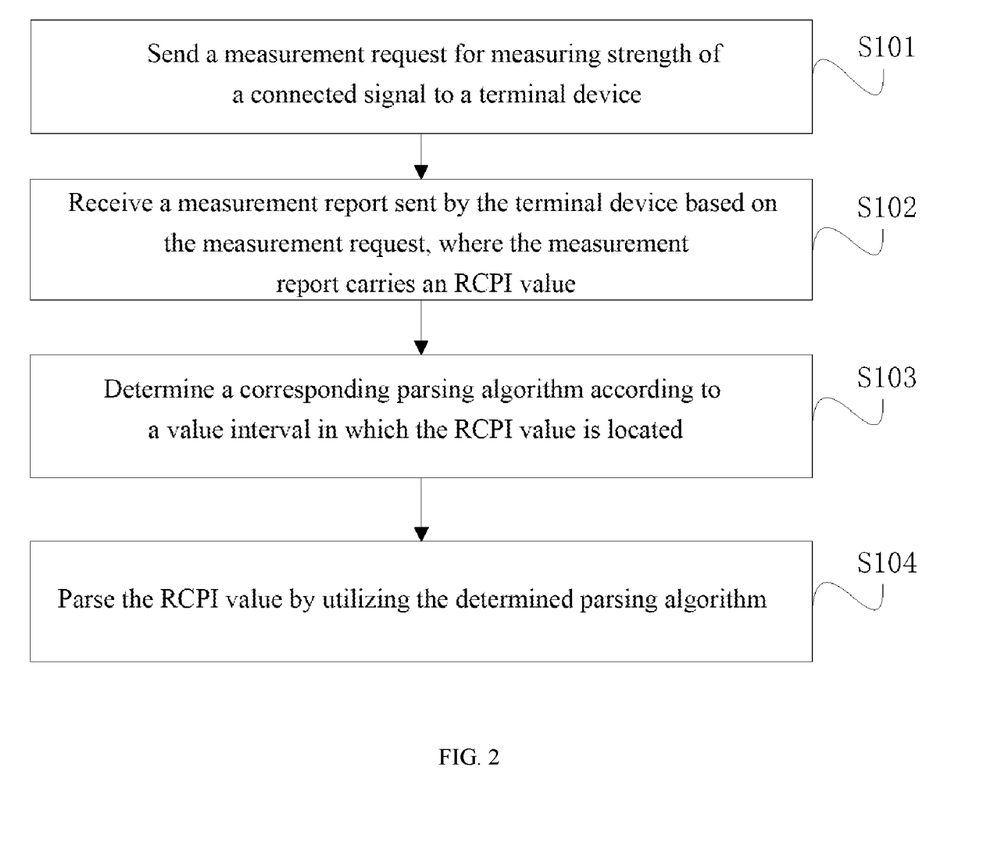
FIG. 2 is a flowchart of a method for parsing a RCPI value provided by Example Embodiment One of the present disclosure.

FIG. 2 is a flowchart of a method for parsing a RCPI value provided by Example Embodiment One of the present disclosure. As shown in FIG. 2, the method for parsing a RCPI value includes, but not limited to, steps S101, S102, S103 and S104.

At S101, a measurement request for measuring strength of a connected signal is sent to a terminal device.

In an embodiment, the terminal device includes a STA supporting the IEEE 802.11k standard from various manufacturers, such as mobile phones or computer terminal devices and the like supporting the IEEE 802.11k standard.

In an embodiment, the measurement request is a measurement request frame or a data frame in which the measurement request is encapsulated.

At S102, a measurement report sent by the terminal device based on the measurement request is received, where the measurement report carries an RCPI value.

In an embodiment, the measurement report is a measurement report frame or a data frame in which the measurement report is encapsulated.

At S103, a corresponding parsing algorithm is determined according to a value interval in which the RCPI value is located.

In an embodiment, the parsing algorithm includes:
(1) Standard parsing algorithm:

$$RSSI=(RCPI/2)-110,$$

where RSSI represents a received signal strength indicator.
(2) Non-standard parsing algorithm:

$$RSSI=RCPI-256,$$

where RSSI represents a received signal strength indicator.

It should be understood that the above standard parsing algorithm and non-standard parsing algorithm are also applicable to all the embodiments described later.

Measured RSSI values of wireless signals are normally negative, but may be 0 dBm only under one condition, that is, when measured through an experiment in an ideal state. 0 dBm means that a receiver has received all wireless signals transmitted by a transmitter, that is, a receiving wireless network card obtains as much power as a wireless AP transmits, which is actually impossible to achieve. According to the above algorithms, when an RCPI value received by the AP is greater than or equal to 220, an RSSI value parsed by utilizing the standard parsing algorithm is greater than or equal to 0 dBm. Such a high signal strength is actually impossible to achieve, so it is unreasonable. Therefore, it can be determined that the non-standard parsing algorithm is suitable for the terminal device STA reporting the RCPI value. When the RCPI value received by the AP is less than or equal to 156, the RSSI value parsed by utilizing the non-standard parsing algorithm is less than or equal to −100 dBm. With such a low signal strength, the terminal device STA should have been disconnected, which is unreasonable. Therefore, it can be determined that the standard parsing algorithm is suitable for the terminal device STA reporting the RCPI value. When the RCPI value received by the AP is greater than 156 and less than 220, it indicates that the terminal device STA is not in an identification area of the AP, and a default parsing algorithm is adopted for this parsing. Subsequently, when the terminal device STA changes in position and enters the identification area of the AP, an appropriate parsing algorithm is determined according to a RCPI value reported by the terminal device STA again.

At S104, the RCPI value is parsed by utilizing the determined parsing algorithm.

In the schemes provided by the embodiment of the present disclosure, by making full use of non-overlapping blind areas, also called unreasonable intervals, respectively existing in the current two parsing algorithms, based on an either/or exclusion method, an appropriate parsing algorithm can be determined by utilizing a value interval in which the obtained RCPI value is located, thereby compatibly parsing two kinds of RCPI values which are output based on different definitions, which improves the accuracy of RCPI value parsing, and thus improves the capability for supporting various terminal device roaming decisions and the precision of roaming decisions.

Example Embodiment Two

Figure 3:
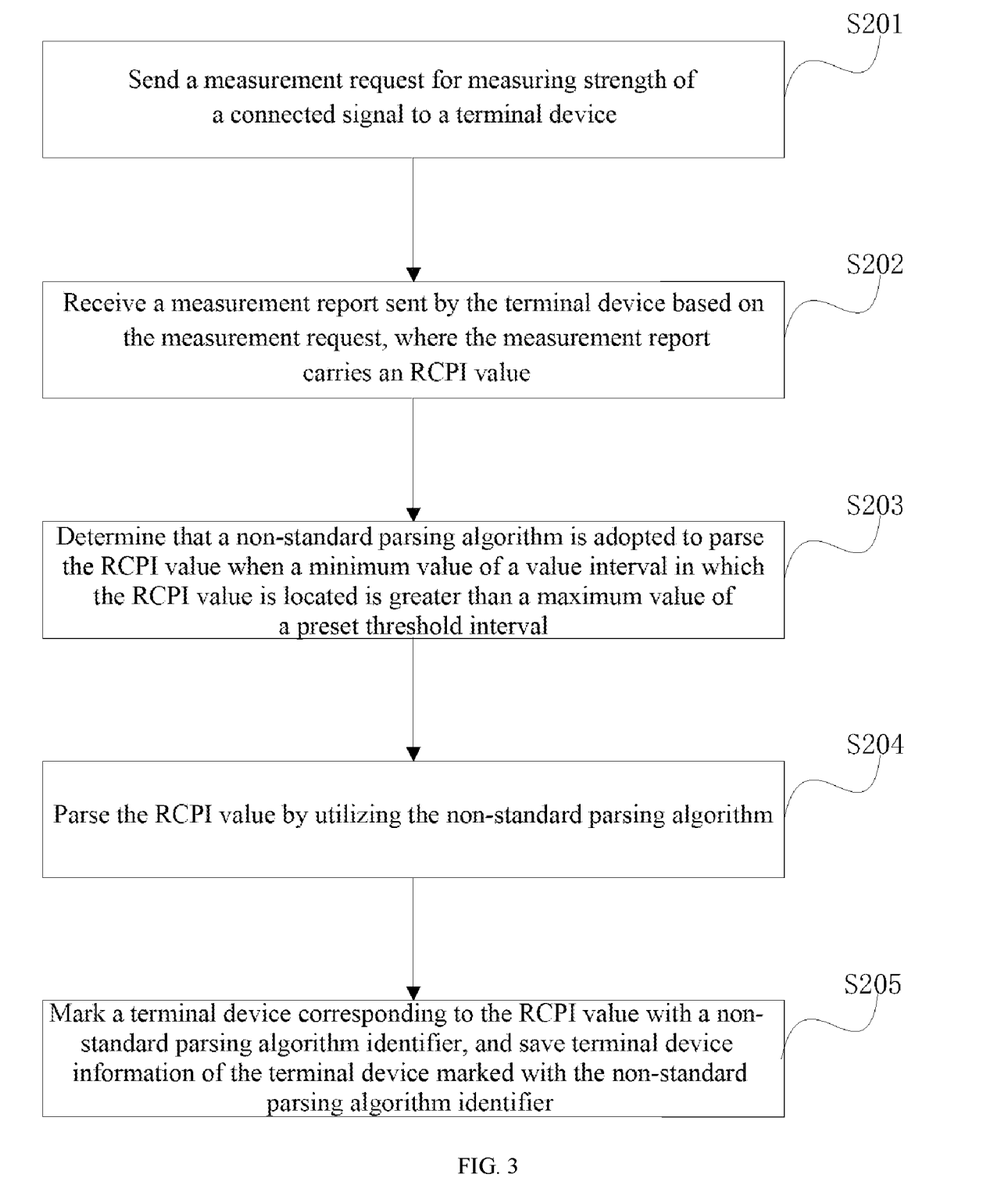
FIG. 3 is a flowchart of a method for parsing a RCPI value provided by Example Embodiment Two of the present disclosure.

FIG. 3 is a flowchart of a method for parsing a RCPI value provided by Example Embodiment Two of the present disclosure. As shown in FIG. 3, the method for parsing a RCPI value includes, but not limited to, steps S201, S202, S203 and S204.

At S201, a measurement request for measuring strength of a connected signal is sent to a terminal device.

In an embodiment, the terminal device includes a STA supporting the IEEE 802.11k standard from various manufacturers, such as mobile phones or computer terminal devices and the like supporting the IEEE 802.11k standard.

In an embodiment, the measurement request is a measurement request frame or a data frame in which the measurement request is encapsulated.

At S202, a measurement report sent by the terminal device based on the measurement request is received, where the measurement report carries an RCPI value.

In an embodiment, the measurement report is a measurement report frame or a data frame in which the measurement report is encapsulated.

At S203, it is determined that a non-standard parsing algorithm is adopted to parse the RCPI value when a minimum value of a value interval in which the RCPI value is located is greater than a maximum value of a preset threshold interval.

In an embodiment, the preset threshold interval may be (156, 220). The measured RSSI values of wireless signals are normally negative, but may be 0 dBm only under one condition, that is, when measured through an experiment in an ideal state. 0 dBm means that a receiver has received all wireless signals transmitted by a transmitter, that is, a receiving wireless network card obtains as much power as a wireless AP transmits, which is actually impossible to achieve. When an RCPI value received by the AP is greater than or equal to 220, an RSSI value parsed by utilizing the standard parsing algorithm is greater than or equal to 0 dBm. Such a high signal strength is actually impossible to achieve, so it is unreasonable. Therefore, it can be determined that the non-standard parsing algorithm is suitable for the terminal device STA reporting the RCPI value.

The above threshold interval is merely an example of the present disclosure, and does not constitute a limitation to the scope of protection of the present disclosure. It should be understood that those having ordinary skills in the art can appropriately narrow the preset threshold interval according to actual network conditions.

At S204, the RCPI value is parsed by utilizing the non-standard parsing algorithm.

In the schemes provided by the embodiment of the present disclosure, by making full use of non-overlapping blind areas, also called unreasonable intervals, respectively existing in the current two parsing algorithms, based on an either/or exclusion method, an appropriate parsing algorithm can be determined by utilizing a value interval in which the obtained RCPI value is located, thereby compatibly parsing two kinds of RCPI values which are output based on different definitions, which improves the accuracy of RCPI value parsing, and thus improves the capability for supporting various terminal device roaming decisions and the precision of roaming decisions.

Additionally, referring to FIG. 3 again, the method for parsing a RCPI value in this embodiment may further include a step S205.

At S205, a terminal device corresponding to the RCPI value is marked with a non-standard parsing algorithm identifier, and terminal device information of the terminal device marked with the non-standard standard parsing algorithm identifier is saved.

In an embodiment, the terminal device information includes a mac address of the terminal device.

In this embodiment of the present disclosure, the terminal device is marked, so that in the subsequent RCPI value parsing process, the non-standard parsing algorithm can be directly adopted to parse the RCPI value reported by the terminal device according to the identifier corresponding to the saved terminal device information, thereby improving the parsing efficiency of RCPI value.

Example Embodiment Three

Figure 4:
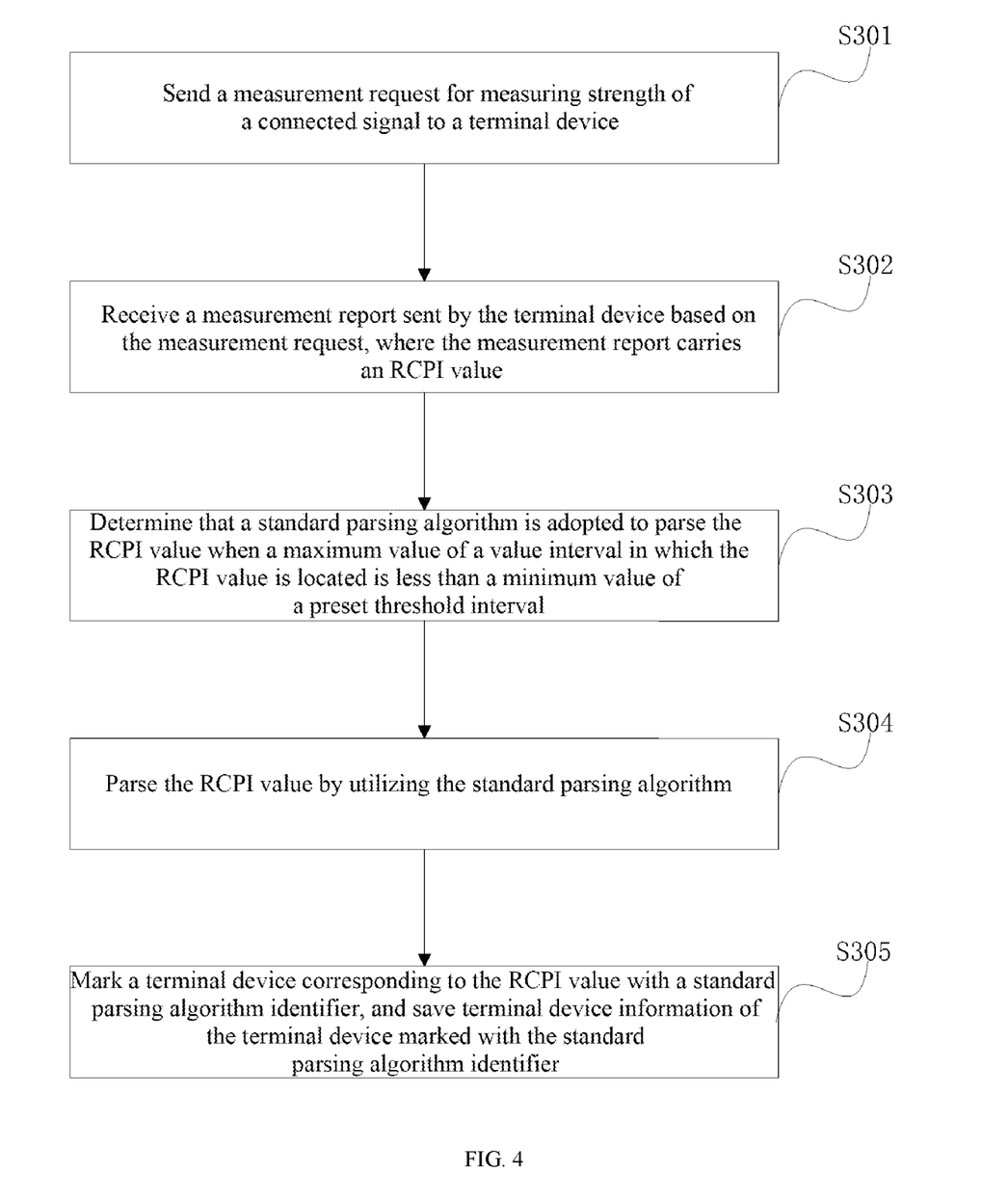
FIG. 4 is a flowchart of a method for parsing a RCPI value provided by Example Embodiment Three of the present disclosure.

FIG. 4 is a flowchart of a method for parsing a RCPI value provided by Example Embodiment Three of the present disclosure. As shown in FIG. 4, the method for parsing a RCPI value includes, but not limited to, steps S301, S302, S303 and S304.

At S301, a measurement request for measuring strength of a connected signal is sent to a terminal device.

In an embodiment, the terminal device includes a STA supporting the IEEE 802.11k standard from various manufacturers, such as mobile phones or computer terminal devices and the like supporting the IEEE 802.11k standard.

In an embodiment, the measurement request is a measurement request frame or a data frame in which the measurement request is encapsulated.

At S302, a measurement report sent by the terminal device based on the measurement request is received, where the measurement report carries an RCPI value.

In an embodiment, the measurement report is a measurement report frame or a data frame in which the measurement report is encapsulated.

At S303, it is determined that a standard parsing algorithm is adopted to parse the RCPI value when a maximum value of a value interval in which the RCPI value is located is less than a minimum value of a preset threshold interval.

In an embodiment, the preset threshold interval may be (156, 220). The measured RSSI values of wireless signals are normally negative, and the smaller the RSSI value, the weaker the signal strength. That is, a receiving wireless network card obtains as much power as a wireless AP transmits, which is actually impossible to achieve. When an RCPI value received by the AP is less than or equal to 156, an RSSI value parsed by utilizing the non-standard parsing algorithm is less than or equal to −100 dBm. With such a low signal strength, the terminal device STA should have been disconnected, which is unreasonable. Therefore, it can be determined that the standard parsing algorithm is suitable for the terminal device STA reporting the RCPI value.

The above threshold interval is merely an example of the present disclosure, and does not constitute a limitation to the scope of protection of the present disclosure. It should be understood that those having ordinary skills in the art can appropriately narrow the preset threshold interval according to actual network conditions.

At S304, the RCPI value is parsed by utilizing the standard parsing algorithm.

In the schemes provided by the embodiment of the present disclosure, by making full use of non-overlapping blind areas, also called unreasonable intervals, respectively existing in the current two parsing algorithms, based on an either/or exclusion method, an appropriate parsing algorithm can be determined by utilizing a value interval in which the obtained RCPI value is located, thereby compatibly parsing two kinds of RCPI values which are output based on different definitions, which improves the accuracy of RCPI value parsing, and thus improves the capability for supporting various terminal device roaming decisions and the precision of roaming decisions.

Additionally, referring to FIG. 4 again, the method for parsing a RCPI value in this embodiment may further include a step S305.

At S305, a terminal device corresponding to the RCPI value is marked with a standard parsing algorithm identifier, and terminal device information of the terminal device marked with the standard parsing algorithm identifier is saved.

In an embodiment, the terminal device information includes a mac address of the terminal device.

In the embodiment of the present disclosure, the terminal device is marked, so that in the subsequent RCPI value parsing process, the standard parsing algorithm can be directly adopted to parse the RCPI value reported by the terminal device according to the identifier corresponding to the saved terminal device information, thereby improving the parsing efficiency of RCPI values.

Example Embodiment Four

Figure 5:
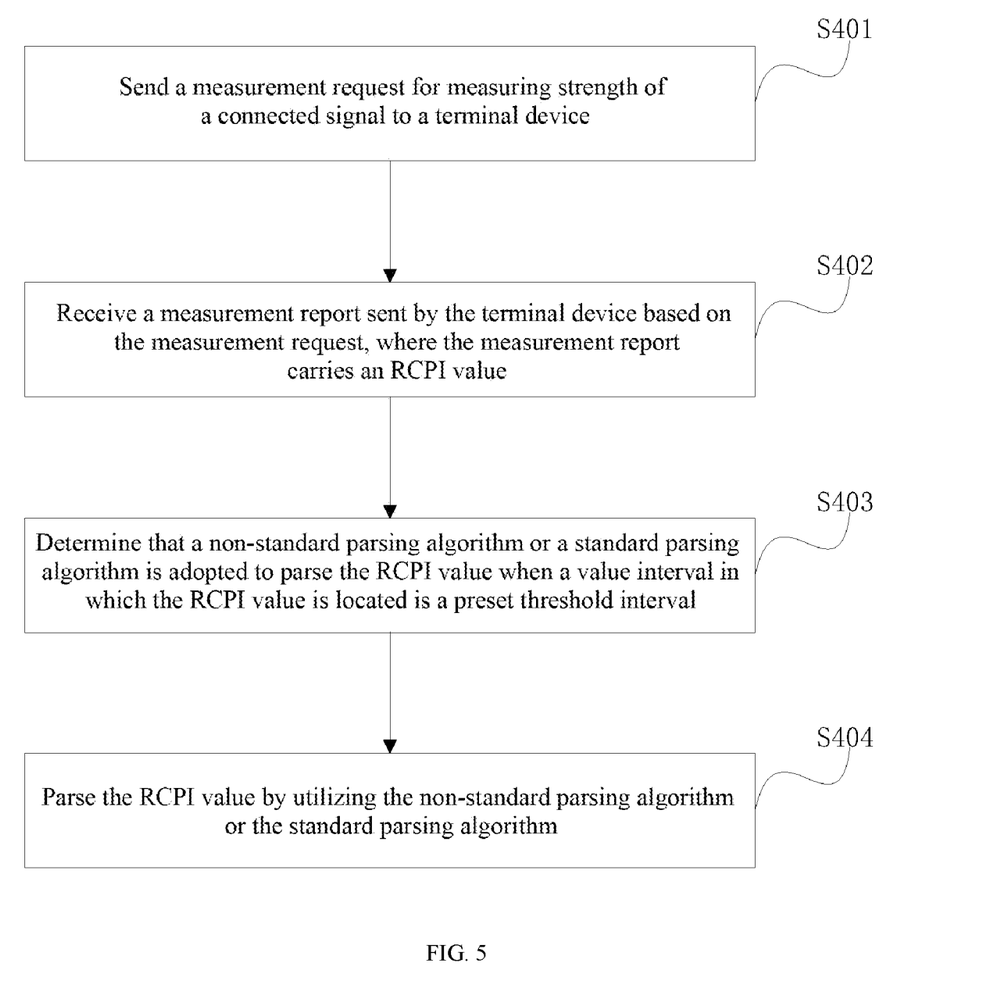
FIG. 5 is a flowchart of a method for parsing a RCPI value provided by Example Embodiment Four of the present disclosure.

FIG. 5 is a flowchart of a method for parsing a RCPI value provided by Example Embodiment Four of the present disclosure. As shown in FIG. 5, the method for parsing a RCPI value includes, but not limited to, steps S401, S402, S403 and S404.

At S401, a measurement request for measuring strength of a connected signal is sent to a terminal device.

In an embodiment, the terminal device includes a STA supporting the IEEE 802.11k standard from various manufacturers, such as mobile phones or computer terminal devices and the like supporting the IEEE 802.11k standard.

In an embodiment, the measurement request is a measurement request frame or a data frame in which the measurement request is encapsulated.

At S402, a measurement report sent by the terminal device based on the measurement request is received, where the measurement report carries an RCPI value.

In an embodiment, the measurement report is a measurement report frame or a data frame in which the measurement report is encapsulated.

At S403, it is determined that a non-standard parsing algorithm or a standard parsing algorithm is adopted to parse the RCPI value when a value interval in which the RCPI value is located is a preset threshold interval.

In an embodiment, the preset threshold interval may be (156, 220). When the RCPI value received by the AP is greater than 156 and less than 220, it indicates that the terminal device STA is not in an identification area of the AP, and a default parsing algorithm is adopted for this parsing. Both algorithms may be used as the default parsing algorithm. Subsequently, when the terminal device STA changes in position and enters the identification area of the AP, an appropriate parsing algorithm is determined according to a RCPI value reported by the terminal device STA again.

The above threshold interval is merely an example of the present disclosure, and does not constitute a limitation to the scope of protection of the present disclosure. It should be understood that those having ordinary skills in the art can appropriately narrow the preset threshold interval according to actual network conditions.

At S404, the RCPI value is parsed by utilizing the non-standard parsing algorithm or the standard parsing algorithm In an embodiment, the non-standard parsing algorithm is generally adopted. On the one hand, the non-standard parsing algorithm is more commonly used by the manufacturers, and on the other hand, terminal devices utilizing the non-standard parsing algorithm are easier to identify and mark. In this way, if a marking error occurs, it is easier to correct.

In the schemes provided by the embodiment of the present disclosure, by making full use of non-overlapping blind areas, also called unreasonable intervals, respectively existing in the current two parsing algorithms, based on an either/or exclusion method, an appropriate parsing algorithm can be determined by utilizing a value interval in which the obtained RCPI value is located, thereby compatibly parsing two kinds of RCPI values which are output based on different definitions, which improves the accuracy of RCPI value parsing, and thus improves the capability for supporting various terminal device roaming decisions and the precision of roaming decisions.

In addition, an embodiment of the present disclosure provides a device which may be an AP device. The device includes: a memory, a processor, and a computer program stored in the memory and executable by the processor.

The processor and the memory may be connected by a bus or in other means.

As a non-transient computer-readable storage medium, the memory may be configured to store non-transient software programs and non-transient computer executable programs. In addition, the memory may include a high-speed random-access memory, and may also include a non-transient memory, such as at least one magnetic disk storage device, a flash memory device, or other non-transient solid state storage device. In some implementations, the memory may optionally include memories remotely located with respect to the processor, and these remote memories may be connected to the processor through networks. Examples of the above networks include, but are not limited to, the Internet, an intranet, a local area network, a mobile communication network and combinations thereof.

It should be noted that the device in this embodiment may be applied to the network topology in the embodiment shown in FIG. 1, and may be used as the controller AP in the embodiment shown in FIG. 1. The device in this embodiment and the controller AP in the embodiment shown in FIG. 1 belong to the same inventive concept, so that these embodiments have the same implementation principle and technical effect, which will not be described in detail here.

The computer program, when executed by the processor, causes the processor to implement the method for parsing a RCPI value in the above embodiments, for example, implement the above method steps S101 to S104 in FIGS. 2, S201 to S205 in FIGS. 3, S301 to S305 in FIGS. 4 and S401 to S404 in FIG. 5.

The device embodiments described above are merely illustrative, and the units described as separate components may or may not be physically separated, that is, may be located in one place, or may be distributed onto multiple network elements. Some or all of the modules may be selected according to actual needs to achieve the purpose of this embodiment.

In addition, an embodiment of the present disclosure further provides a computer-readable storage medium storing a computer-executable instruction which, when executed by a processor or controller, for example, by a processor of the access point (AP) device, causes the processor to implement the method for parsing a RCPI value in the above embodiments, for example, implement the above method steps S101 to S104 in FIGS. 2, S201 to S205 in FIGS. 3, S301 to S305 in FIGS. 4 and S401 to S404 in FIG. 5.

Embodiments of the present disclosure include: sending a measurement request for measuring strength of a connected signal to a terminal device; receiving a measurement report sent by the terminal device based on the measurement request, where the measurement report carries an RCPI value; determining a corresponding parsing algorithm according to a value interval in which the RCPI value is located; and parsing the RCPI value by utilizing the determined parsing algorithm. In the schemes provided by the embodiments of the present disclosure, by making full use of non-overlapping blind areas, also called unreasonable intervals, respectively existing in the current two parsing algorithms, based on the either/or exclusion method, an appropriate parsing algorithm can be determined by utilizing a value interval in which the obtained RCPI value is located, thereby improving the accuracy of RCPI value parsing.

As will be understood by those having ordinary skills in the art that all or some of the steps in the method, and systems disclosed above may be implemented as software, firmware, hardware and appropriate combinations thereof. Some or all of the physical components may be implemented as software executed by a processor, such as a central processing unit, a digital signal processor or a microprocessor, or as hardware, or as an integrated circuit, such as an application specific integrated circuit. Such software may be distributed on a computer-readable medium, and the computer-readable medium may include a computer storage medium (or a non-transitory medium) and a communication medium (or a transitory medium). As is well known to those having ordinary skills in the art, the term computer storage medium includes volatile and non-volatile, removable and non-removable media implemented in any method or technology for storing information such as computer-readable instructions, data structures, program modules or other data. A computer storage medium may include RAMs, ROMs, EEPROMs, flash memories or other memory technologies, CD-ROMs, digital versatile disks (DVDs) or other optical disk storages, magnetic cassettes, magnetic tapes, magnetic disk storages or other magnetic storage devices, or any other media that can be used to store desired information and can be accessed by a computer. In addition, it is well known to those having ordinary skills in the art that the communication medium may generally include computer-readable instructions, data structures, program modules or other data in a modulated data signal such as a carrier wave or other transmission mechanism, and may include any information delivery medium.

The above is a detailed description of some implementations of the present disclosure, but the present disclosure is not limited thereto. Those having ordinary skills in the art may also make various equivalent modifications or substitutions without departing from the gist of the present disclosure, and these equivalent modifications or substitutions shall fall within the protection scope defined by the claims of the present disclosure.

What is claimed is:

1. A method for parsing a Received Channel Power Indicator (RCPI) value, performed by a controller access point (AP) in a wireless mesh network, comprising:
    sending a measurement request for measuring strength of a connected signal to a terminal device;
    receiving a measurement report sent by the terminal device based on the measurement request, wherein the measurement report carries an RCPI value;
    determining a corresponding parsing algorithm according to a value range in which the RCPI value is located; and
    parsing the RCPI value by utilizing the determined parsing algorithm;
    wherein determining a corresponding parsing algorithm according to a value range in which the RCPI value is located comprises:
        determining that a non-standard parsing algorithm is adopted to parse the RCPI value in response to a minimum value of the value range in which the RCPI value is located being greater than a maximum value of a preset threshold range, wherein the non-standard parsing algorithm is: RSSI=RCPI−256;
        wherein RSSI represents a received signal strength indicator.

2. The method for parsing a RCPI value of claim 1, wherein determining a corresponding parsing algorithm according to a value range in which the RCPI value is located comprises:
    determining that a standard parsing algorithm is adopted to parse the RCPI value in response to a maximum value of the value range in which the RCPI value is located being less than a minimum value of the preset threshold range, wherein the standard parsing algorithm is: RSSI=(RCPI/2)−100.

3. The method for parsing a RCPI value of claim 2, wherein determining a corresponding parsing algorithm according to a value range in which the RCPI value is located comprises:
    determining that the non-standard parsing algorithm or the standard parsing algorithm is adopted to parse the RCPI value in response to the value range in which the RCPI value is located being the preset threshold range.

4. The method for parsing a RCPI value of claim 1, further comprising:
    marking a terminal device corresponding to the RCPI value with a non-standard parsing algorithm identifier; and saving terminal device information of the terminal device marked with the non-standard parsing algorithm identifier.

5. The method for parsing a RCPI value of claim 2, further comprising:
marking a terminal device corresponding to the RCPI value with a standard parsing algorithm identifier; and
saving terminal device information of the terminal device marked with the standard parsing algorithm identifier.

6. A controller access point (AP) in a wireless mesh network, comprising a memory, a processor, and a computer program stored in the memory and executable by the processor which, when executed by the processor, causes the processor to perform a method for parsing a RCPI value comprising:
sending a measurement request for measuring strength of a connected signal to a terminal device;
receiving a measurement report sent by the terminal device based on the measurement request, wherein the measurement report carries an RCPI value;
determining a corresponding parsing algorithm according to a value range in which the RCPI value is located; and
parsing the RCPI value by utilizing the determined parsing algorithm;
wherein determining a corresponding parsing algorithm according to a value range in which the RCPI value is located comprises:
determining that a non-standard parsing algorithm is adopted to parse the RCPI value in response to a minimum value of the value range in which the RCPI value is located being greater than a maximum value of a preset threshold range, wherein the non-standard parsing algorithm is: RSSI=RCPI−256;
wherein RSSI represents a received signal strength indicator.

7. A non-transitory computer-readable storage medium, which is stored with a computer executable instruction for performing a method for parsing a RCPI value by a controller access point in a wireless mesh network, the method comprising:
sending a measurement request for measuring strength of a connected signal to a terminal device;
receiving a measurement report sent by the terminal device based on the measurement request, wherein the measurement report carries an RCPI value;
determining a corresponding parsing algorithm according to a value range in which the RCPI value is located; and
parsing the RCPI value by utilizing the determined parsing algorithm;
wherein determining a corresponding parsing algorithm according to a value range in which the RCPI value is located comprises:
determining that a non-standard parsing algorithm is adopted to parse the RCPI value in response to a minimum value of the value range in which the RCPI value is located being greater than a maximum value of a preset threshold range, wherein the non-standard parsing algorithm is: RSSI=RCPI−256;
wherein RSSI represents a received signal strength indicator.

8. The controller AP of claim 6, wherein determining a corresponding parsing algorithm according to a value range in which the RCPI value is located comprises:
determining that a standard parsing algorithm is adopted to parse the RCPI value in response to a maximum value of the value range in which the RCPI value is located being less than a minimum value of the preset threshold range, wherein the standard parsing algorithm is: RSSI=(RCPI/2)−100.

9. The controller AP of claim 8, wherein determining a corresponding parsing algorithm according to a value range in which the RCPI value is located comprises:
determining that the non-standard parsing algorithm or the standard parsing algorithm is adopted to parse the RCPI value in response to the value range in which the RCPI value is located being the preset threshold range.

10. The controller AP of claim 6, further comprising:
marking a terminal device corresponding to the RCPI value with a non-standard parsing algorithm identifier; and
saving terminal device information of the terminal device marked with the non-standard parsing algorithm identifier.

11. The controller AP of claim 8, further comprising:
marking a terminal device corresponding to the RCPI value with a standard parsing algorithm identifier; and
saving terminal device information of the terminal device marked with the standard parsing algorithm identifier.

12. The non-transitory computer-readable storage medium for parsing a RCPI value of claim 7, wherein determining a corresponding parsing algorithm according to a value range in which the RCPI value is located comprises:
determining that a standard parsing algorithm is adopted to parse the RCPI value in response to a maximum value of the value range in which the RCPI value is located being less than a minimum value of the preset threshold range, wherein the standard parsing algorithm is: RSSI=(RCPI/2)−100.

13. The non-transitory computer-readable storage medium for parsing a RCPI value of claim 12, wherein determining a corresponding parsing algorithm according to a value range in which the RCPI value is located comprises:
determining that the non-standard parsing algorithm or the standard parsing algorithm is adopted to parse the RCPI value in response to the value range in which the RCPI value is located being the preset threshold range.

* * * * *